(No Model.)

C. Q. HAYES.
CAR TRUCK.

No. 267,425. Patented Nov. 14, 1882.

Attest:

Inventor
Calvin Q. Hayes,
by Ellis Spear
Atty.

UNITED STATES PATENT OFFICE.

CALVIN Q. HAYES, OF SEDALIA, MISSOURI.

CAR-TRUCK.

SPECIFICATION forming part of Letters Patent No. 267,425, dated November 14, 1882.

Application filed May 3, 1882. (No model.)

*To all whom it may concern:*

Be it known that I, CALVIN Q. HAYES, of Sedalia, in the county of Pettis and State of Missouri, have invented a new and useful Improvement in Car-Trucks; and I do hereby declare that the following is a full, clear, and exact description of the same.

My invention relates to an improvement in the construction of car-trucks; and its object is to provide a support for the truck which shall yield to the increased weight when the car is loaded, and rise when it is light.

The invention consists in combining with a stationary car-axle a float rigidly secured to such axle, a surrounding cylinder revolving with the wheels, and an interposed filling of quicksilver, in which the float is sustained, the truck-frame being secured to the axle, so that the entire car-body is sustained by its own buoyancy, being depressed by increased weight and rising as such weight diminishes.

Figure 1:
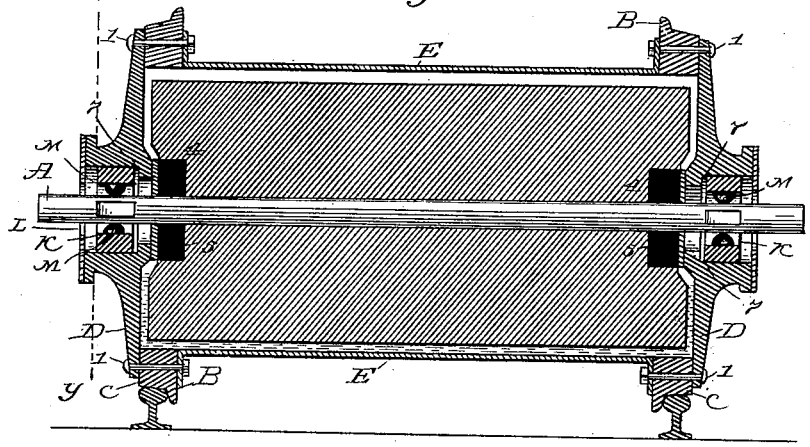
Figure 2:
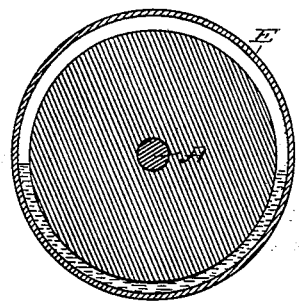
Figure 3:
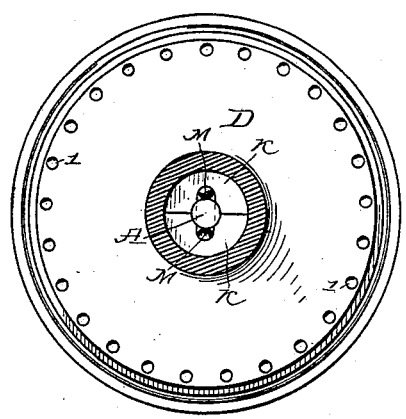

In the accompanying drawings, Figure 1 is a horizontal section taken through the axle. Fig. 2 is a central vertical section, and Fig. 3 a vertical section on line $y\ y$ of Fig. 1.

In these drawings, A is the axle of a pair of car-wheels, B B. Each wheel is composed of a tread, C, and a hub or face plate, D, which is bolted to the tread by bolts 1 1. The bolts 1 1 serve also to rigidly secure to the inside face of the wheels the cylinder E, which is of slightly less diameter than the wheels, and when secured thereto, as shown, turns with such wheels.

Rigidly secured to the axle A is a float or log of wood, in cross-section a slightly-flattened circle and adapted to fit within the cylinder E, leaving a space of about one inch between it and the inner face of the cylinder, where its sides are flattened, in order to permit vertical motion to that extent within such cylinder.

The hub of the wheel is slotted vertically, the slot being of sufficient width to receive the axle, which at this point is flattened, and the axle extends out beyond the wheel, and, being stationary, is adapted to form a support for the truck-frame and car-body, secured thereto in any suitable manner.

The space between the float and the surrounding cylinder E is partially filled with quicksilver. From its great specific gravity a comparatively small bulk of the latter is necessary to support the weight of the car-body, which is thus entirely supported, so that it has a free vertical movement, the axle sliding vertically in the slots before mentioned.

At each end of the float is a recess, 4, which receives a perforated block, 5, of solid rubber, Fig. 1, which presses a metallic plate against the wheel and prevents the mercury, when the car is in motion, from being forced out at the joint.

The bearing for the wheel consists of two semicircular boxes, K K, surrounding the axle, and slotted longitudinally, to permit the axle to have the required vertical movement. Rubber cushions M M, interposed between the boxes and the axle, deaden the sound and prevent concussion. The boxes abut against a shoulder, 7, in the wheel, as shown in Fig. 1. The opening in the wheel is closed by a cap-plate, L, of any suitable construction.

By this construction it will be noticed that while the wheels run freely, carrying in their rotation the cylinder E, the axle and float are stationary, and the mercury in the cylinder will of course remain in the bottom of the cylinder, maintained there by its weight. As the load on the car increases the mercury is proportionately displaced and rises in the space surrounding the float, holding the car-body constantly in suspension, entirely independent of the wheels.

I do not confine myself to the construction of journal-boxes described, since while retaining the principle of my invention it is possible to vary greatly the details. Oil or other fluid may be mingled with the mercury, if desired.

I have described this construction as applied to railway-cars; but it is evident that the principle can be applied to other classes of wheeled vehicles, and such applications are included in my invention.

Having thus described my invention, what I claim is—

1. A car-truck consisting of loose wheels, a fixed axle, a float, and a cylinder containing quicksilver.

2. An axle and float rigidly secured together, in combination with a surrounding cylinder containing quicksilver, such cylinder being secured to the wheels.

3. The combination of the axle adapted to support the truck-frame and car-body, the float rigidly secured thereto, the wheels slotted to permit vertical movement of the axle, and the cylinder bolted to the wheels and adapted to contain quicksilver, whereby the car-body is supported by the said quicksilver, as described.

In testimony whereof I have signed my name to this specification in the presence of two subscribing witnesses.

CALVIN Q. HAYES.

Witnesses:
R. W. BARNETT,
J. R. WEBBER.